United States Patent
Akpala et al.

(10) Patent No.: US 11,640,633 B2
(45) Date of Patent: *May 2, 2023

(54) ENHANCED SHOPPING ACTIONS ON A MOBILE DEVICE

(71) Applicant: eBay Inc., San Jose, CA (US)

(72) Inventors: Romi Akpala, Oakland, CA (US); Shikha Khare, San Jose, CA (US); Bryce Watson, Portland, OR (US)

(73) Assignee: eBay Inc., San Jose, CA (US)

(*) Notice: Subject to any disclaimer, the term of this patent is extended or adjusted under 35 U.S.C. 154(b) by 170 days.

This patent is subject to a terminal disclaimer.

(21) Appl. No.: 17/174,915

(22) Filed: Feb. 12, 2021

(65) Prior Publication Data

US 2021/0166288 A1 Jun. 3, 2021

Related U.S. Application Data

(63) Continuation of application No. 16/184,467, filed on Nov. 8, 2018, now Pat. No. 10,949,905, which is a
(Continued)

(51) Int. Cl.
*G06Q 30/06* (2023.01)
*G06Q 30/0601* (2023.01)
(Continued)

(52) U.S. Cl.
CPC ....... *G06Q 30/0625* (2013.01); *G06F 3/0488* (2013.01); *G06F 3/04842* (2013.01)

(58) Field of Classification Search
CPC ............ G06Q 30/0625; G06Q 30/0601; G06F 3/0482; G06F 3/0488
(Continued)

(56) References Cited

U.S. PATENT DOCUMENTS 7,683,889 B2 3/2010 Rimas et al.
9,152,955 B2 10/2015 Mathew et al.
(Continued)

FOREIGN PATENT DOCUMENTS

CA 2707795 A1 2/2011
CA 2780386 A1 * 12/2012 ............. G06F 1/169
(Continued)

OTHER PUBLICATIONS

Article, "United States Patent for Apparatus and Method for Improving Input Position and Pressure Detection in a Pressure Detection Touch Screen Issued to Samsung Electronics"; Global IP News. Information Technology Patent News [New Delhi] May 5, 2015; (Year: 2015).*

(Continued)

*Primary Examiner* — Yogesh C Garg
(74) *Attorney, Agent, or Firm* — FIG. 1 Patents

(57) ABSTRACT

Example embodiments described herein disclose a specially configured device to receive and recognize enhanced user interactions through a graphical user interface. A user device may accordingly receive and display a set of search results, detect a user input entered via a touch-input device related to a single item from among the set of search results, determine a pressure exerted upon the touch-input device corresponding to the user input, and based on at least the pressure of the user input, select and execute an appropriate commerce action.

20 Claims, 12 Drawing Sheets

Related U.S. Application Data continuation of application No. 14/799,360, filed on Jul. 14, 2015, now Pat. No. 10,157,410.

(51) Int. Cl.
    *G06F 3/04842*     (2022.01)
    *G06F 3/0488*     (2022.01)

(58) Field of Classification Search
    USPC ........................................ 705/26.62
    See application file for complete search history.

(56) References Cited

U.S. PATENT DOCUMENTS

| | | | |
|---|---|---|---|
| 10,157,410 | B2 | 12/2018 | Akpala et al. |
| 10,949,905 | B2 | 3/2021 | Akpala et al. |
| 2006/0036565 | A1 | 2/2006 | Bruecken et al. |
| 2006/0132456 | A1 | 6/2006 | Anson |
| 2009/0119278 | A1 | 5/2009 | Cross et al. |
| 2010/0005390 | A1* | 1/2010 | Bong ............ G06F 3/0486 715/702 |
| 2010/0205066 | A1 | 8/2010 | Ho et al. |
| 2010/0313139 | A1 | 12/2010 | Watfa et al. |
| 2012/0036468 | A1 | 2/2012 | Colley |
| 2012/0040763 | A1* | 2/2012 | Auterio ............ A63F 13/216 463/42 |
| 2012/0254808 | A1 | 10/2012 | Gildfind |
| 2012/0271712 | A1 | 10/2012 | Katzin et al. |
| 2014/0267114 | A1 | 9/2014 | Lisseman et al. |
| 2014/0297415 | A1 | 10/2014 | Chu et al. |
| 2014/0358782 | A1 | 12/2014 | Gura et al. |
| 2015/0051966 | A1* | 2/2015 | Publicover ......... G06Q 30/0277 705/14.54 |
| 2015/0293997 | A1 | 10/2015 | Smith et al. |
| 2016/0132773 | A1 | 5/2016 | Chandrasekaran et al. |
| 2017/0018018 | A1 | 1/2017 | Akpala et al. |
| 2019/0080382 | A1 | 3/2019 | Akpala et al. |

FOREIGN PATENT DOCUMENTS

| | | | | |
|---|---|---|---|---|
| CN | 101620507 | A | * 1/2010 | ........... G06F 1/1626 |
| KR | 20100039194 | A | * 4/2010 | ......... G06F 3/04855 |

OTHER PUBLICATIONS

Final Office Action received for U.S. Appl. No. 14/799,360, dated May 17, 2018, 10 pages.
Non-Final Office Action received for U.S. Appl. No. 14/799,360, dated Jan. 17, 2018, 13 pages.
Notice of Allowance received for U.S. Appl. No. 14/799,360, dated Aug. 1, 2018, 8 pages.
Final Office Action Received for U.S. Appl. No. 16/184,467, dated Oct. 28, 2020, 9 pages.
Non Final Office Action Received for U.S. Appl. No. 16/184,467, dated Jun. 24, 2020, 19 pages.
Notice of Allowance received for U.S. Appl. No. 16/184,467, dated Dec. 9, 2020, 9 Pages.

* cited by examiner

ENHANCED SHOPPING ACTIONS ON A MOBILE DEVICE

CLAIM OF PRIORITY

This application is a Continuation of U.S. application Ser. No. 16/184,467, filed Nov. 8, 2018, which is a Continuation of U.S. application Ser. No. 14/799,360, filed Jul. 14, 2015, which is hereby incorporated by reference in its entirety.

TECHNICAL FIELD

Embodiments of the present disclosure relate generally to data processing and, more particularly, but not by way of limitation, to a specially configured device to receive and recognize enhanced shopping actions.

BACKGROUND

Portable electronic devices, such as smart phones, wearable devices, and various other connected mobile devices have become ubiquitous. As a result of dramatic improvements in processor speeds and capabilities, as well as memory speed, density and other characteristics, mobile devices continue to decrease in size, while still increasing in functionality. A side effect of the decreasing size of display screens has been a lack of effective means for receiving and enabling user interactions.

Existing solutions focus on varying and altering the content that is displayed by, for example, decreasing the size of graphical elements, or only showing small portions of a displayed interface at any given time. While this solution does enable a user to access and view the entirety of a displayed image, it fails to address the issues associated with effectively receiving user interactions with the displayed image.

BRIEF DESCRIPTION OF THE DRAWINGS

Various ones of the appended drawings merely illustrate example embodiments of the present disclosure and cannot be considered as limiting its scope.

Figure 1:
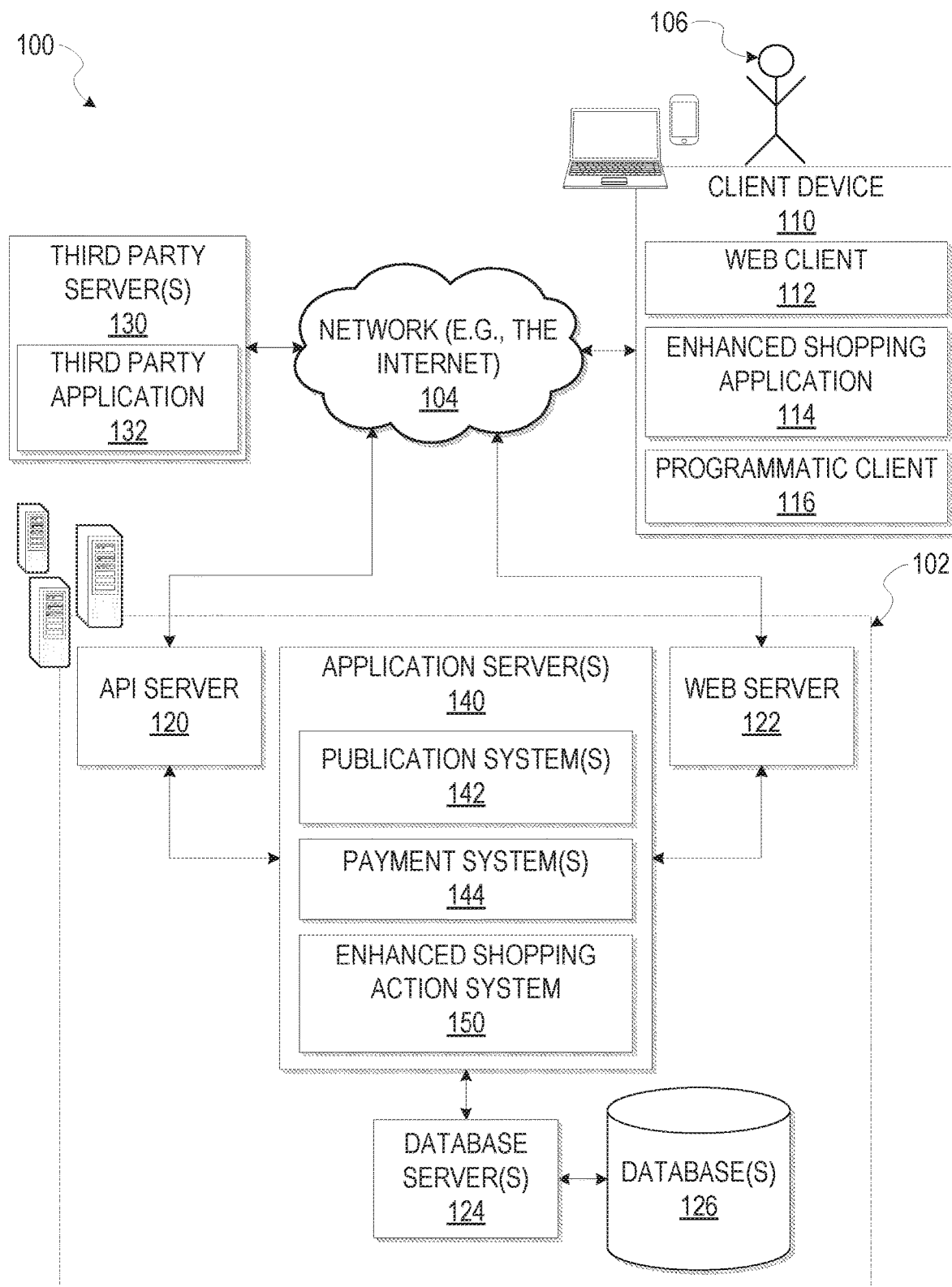
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Example embodiments described herein disclose a specially configured device to receive and recognize enhanced user interactions (e.g., shopping actions) through a graphical user interface. The enhanced shopping action system may be or include a group of one or more server machines. A user device may accordingly receive and display a set of search results (e.g., one or more items available for purchase), detect a user input entered via a touch-input device related to a single item from among the set of search results, determine a pressure exerted upon the touch-input device corresponding to the user input, and based on at least the pressure of the user-input, select and execute an appropriate commerce action. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

According to various embodiments, the enhanced user action system is configured to determine a user interest level of a user based on a user context. The user context includes a collection of information used to characterize a state of the user in a session. The information may include, for example, a user search history (e.g., a historical search history, or a session-specific search history), as well as an interaction history (e.g., a historical interaction history, or a session-specific interaction history) of the user. The user interest level indicates a user's interest in particular items among a set of items included within a set of search results. User interest levels may include a set of interest levels including, "low-interest," "medium-interest," "high-interest," as well as intermediary interest levels existing between the previously mentioned user interest levels. In practice, the user interest level indicates a user's interest in a particular item, such as whether the user is prepared to make an immediate purchase, or if the user is researching a particular item or set of items. Additionally, the enhanced user action system may be configured to provide an indication of the determined user interest level within the graphical user interface.

Selection of the commerce action may, in some example embodiments, be based on the determined user interest and the pressure of the user input. The enhanced shopping action system may define a set of possible commerce actions based on the determined user interest level, and then select a commerce action from among the defined set of commerce actions based on the pressure of the user input. For example, the enhanced shopping action system may determine that a firm pressure combined with a high user interest level (e.g., indicating a desire to immediately purchase a particular item), results in a commerce action comprising requesting payment information from the user to immediately purchase the desired item. Alternatively, the enhanced shopping action system may determine that a soft pressure results in the enhanced shopping action system executing a commerce action which includes displaying additional item details, or adding the item to a watch list.

Commerce actions may include, but are not limited to: causing an immediate purchase of an item from among a set of items, adding an item to a watch list or wish list, bidding on an item, or requesting user login credentials. In some embodiments, the enhanced shopping action system may associate a threshold pressure value with each of the commerce actions among a set of commerce actions, and select an appropriate commerce action based on the pressure of a user input transgressing the predefined threshold value.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an enhanced shopping application 114, and a programmatic client 116 executing on client device 110.

The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102 which is configured to receive a touch-input. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via the client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given client device 110, then this application is configured to locally provide the user interface and at least some of the functionalities with the application configured to communicate with the networked system 102, on an as-needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application server(s) 140 may host one or more publication systems 142 and payment systems 144, each of which may comprise one or more modules or applications and each of which may be embodied as hardware, software, firmware, or any combination thereof. The application server(s) 140 are, in turn, shown to be coupled to one or more database servers 124 that facilitate access to one or more information storage repositories or database(s) 126. In an example embodiment, the database(s) 126 are storage devices that store information to be posted (e.g., publications or listings) to the publication system(s) 142. The database(s) 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication system(s) 142 may provide a number of publication functions and services to users 106 that access the networked system 102. The payment system(s) 144 may likewise provide a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some embodiments, the payment system(s) 144 may form part of the publication system(s) 142.

The enhanced shopping action system 150 may provide functionality operable to perform various enhanced shopping actions using the user selected data. For example, the enhanced shopping action system 150 may access the user selected data from the database(s) 126, the third party server(s) 130, the publication system(s) 142, and other sources. In some example embodiments, the enhanced shopping action system 150 may analyze the user data to perform enhanced shopping actions. As more content is added to a category by the user, the enhanced shopping action system 150 can further refine the shopping actions. In some example embodiments, the enhanced shopping action system 150 may communicate with the publication system(s) 142 (e.g., accessing item listings) and payment system(s) 144. In an alternative embodiment, the enhanced shopping action system 150 may be a part of the publication system(s) 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system(s) 142, payment system(s) 144, and enhanced shopping action system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Figure 2:
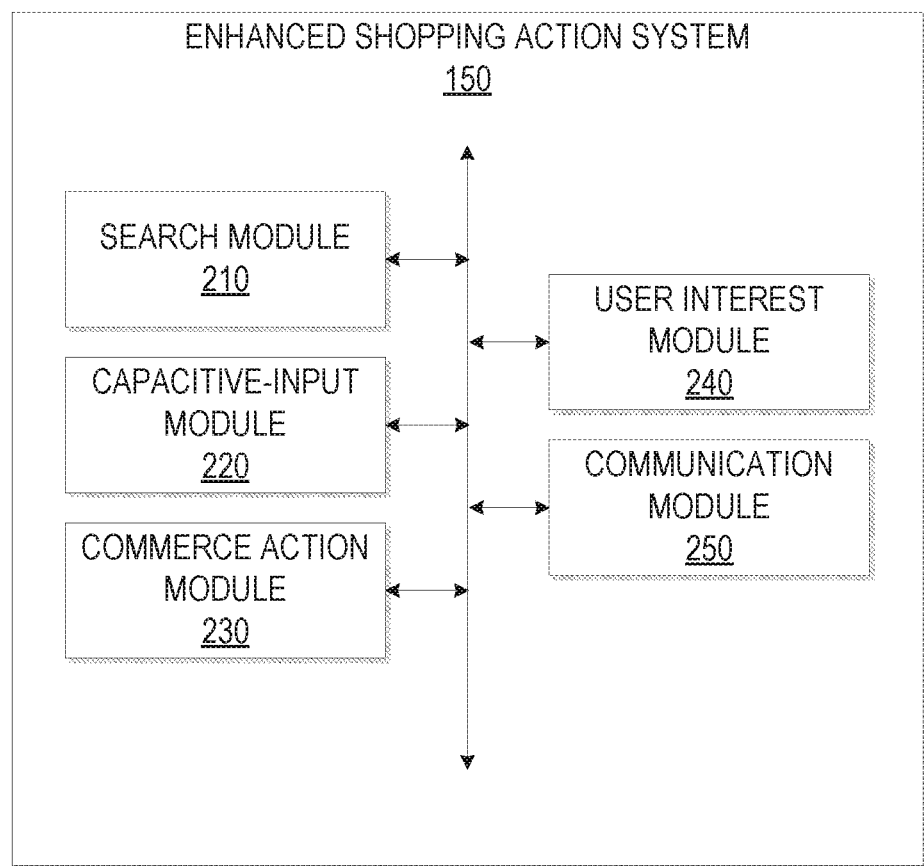
FIG. 2 is a block diagram illustrating components of an enhanced shopping action system suitable for providing enhanced shopping actions, according to some example embodiments.

FIG. 2 is a block diagram illustrating components of the enhanced shopping action system 150 that configure the enhanced shopping action system 150 to display a set of search results, detect a user input entered via a touch-input device, determine a pressure exerted upon the touch-input device, select a commerce action, and perform the selected commerce action. The enhanced shopping action system 150 is shown as including a search module 210, a touch-input module 220, a commerce action module 230, a user interest module 240, and a communication module 250, all configured to communicate with each other (e.g., via a bus, shared memory, or a switch). Any one or more of these modules may be implemented using one or more processors and hence may include one or more processors (e.g., by configuring such one or more processors to perform functions described for that module).

Any of the modules discussed above may be implemented using hardware alone (e.g., one or more processors), or a combination of hardware and software. For example, any module described of the enhanced shopping action system 150 may physically include an arrangement of one or more processors configured to perform operations described herein for that module. As another example, any module of the enhanced shopping action system 150 may include software, hardware, or both, that configure an arrangement of one or more processors to perform the operations described herein for that module. Accordingly, different modules of the enhanced shopping action system 150 may include and configure different arrangements of such processors or a single arrangement of such processors as different points in time. Moreover, any two or more modules of the enhanced shopping action system 150 may be combined into a single module, and the functions described herein for a single module may be subdivided among multiple modules. Furthermore, according to various example embodiments, modules described herein as being implemented within a single machine, database, or device may be distributed across multiple machines, databases, or devices.

The search module 210 is configured to retrieve and present a set of search results based on search criteria. The search criteria may include at least one or more keywords, location information (e.g., the location of the client device 110, or user 106), a transaction history of the user 106, or an interaction history of the user 106. For example, the search module 210 may receive search criteria from the client device 110, and based on the received search criteria, retrieve one or more search results through the network 104, and cause the search results to display at the client device 110.

The touch-input module 220 is configured to receive and recognize a set of pre-defined gestures entered via a touch-input device (e.g., client device 110). For example, the touch-input device may include a sensor board configured to detect a set of predefined gestures as user inputs. The predefined gestures may include touching or tapping a display of the user device (e.g., client device 110), as well as swiping gestures. In some embodiments, the touch-input module 220 may be configured to define gestures based on one or more user inputs received from a user device (e.g., client device 110).

The commerce action module 230 is configured to work with the touch-input module 220 in recognizing and selecting commerce actions from among a set of commerce actions, based on a user input identified by the touch-input module 220. The commerce action module 230 receives a user input from the touch-input module 220, and based on the received user input, may select a commerce action from among a set of commerce actions. In some embodiments, the commerce action module 230 may also be configured to receive commerce action definitions from a user device (e.g., client device 110), and assign the commerce actions to user inputs received from the touch-input module 220.

The user interest module 240 is configured to determine a user interest level based on a user context. The user context includes a collection of information used to characterize a state of the user in a session. The information may include, for example, a user search history (e.g., a historical search history, or a session-specific search history), as well as an interaction history (e.g., a historical interaction history, or a session-specific interaction history), and user profile information. The user interest level indicates a user's interest in one or more items, to determine an appropriate commerce action by the commerce action module 230.

The communication module 250 is configured to send and receive information for the enhanced shopping action system 150. The communication module 250 may communicate through the network 104 to the application server(s) 140, as well as third party server(s) 130.

Figure 3:
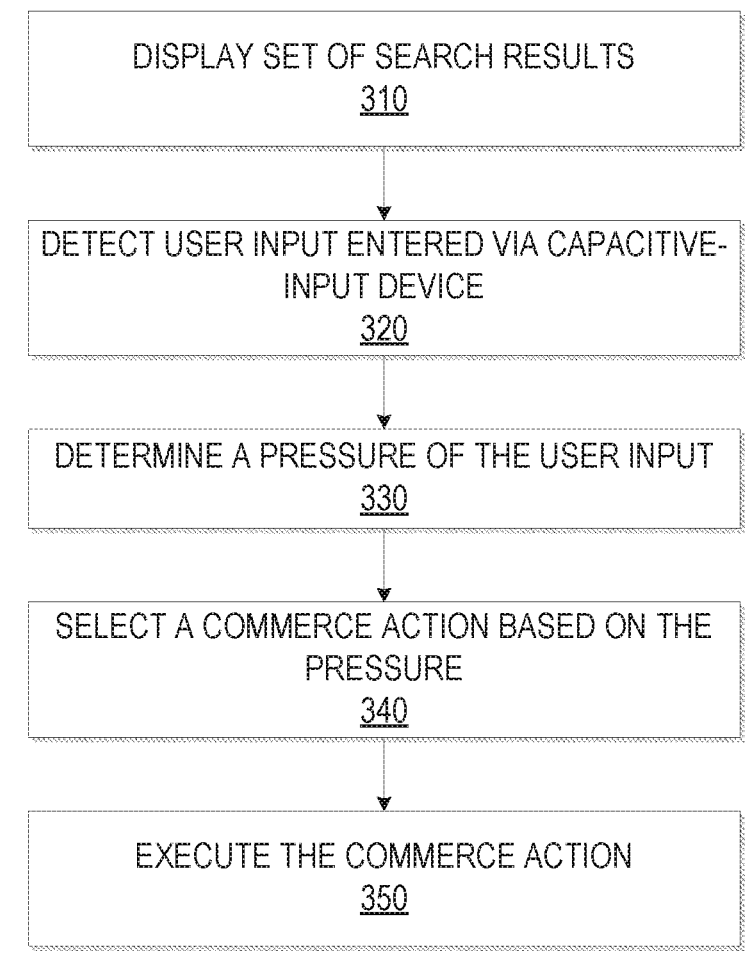
FIG. 3 is a flowchart illustrating operations of the enhanced shopping action system in performing a method of selecting and executing commerce actions based on a user input, according to some example embodiments.

FIG. 3 is a flowchart illustrating operations of the enhanced shopping action system in performing a method 300 of selecting and executing commerce actions based on a user input, according to some example embodiments. Operations of the method 300 may be performed by the modules described above with respect to FIG. 2. As shown in FIG. 3, the method 300 may include operations 310, 320, 330, 340, and 350.

In operation 310, the search module 210 retrieves and displays a set of one or more search results at a user device (e.g., client device 110). The search results may include one or more listings of items available for sale within a network based marketplace. In some embodiments, the search results are each represented as a graphical element with corresponding locations within a graphical user interface.

In operation 320, the touch-input module 220 receives a user input entered into a touch-input device (e.g., client device 110). The user input includes one or more pre-defined gestures such as, a tap, a double-tap, or a swiping motion, which the touch-input device recognizes. Additionally, the touch-input module 220 is configured to receive a location of the user input on the graphical user interface of the touch-input device (e.g., client device 110), as well as additional user input descriptors, including a duration of the user input, a pressure of the user input (e.g., soft, medium, firm), a direction of movement of the user input, and a frequency (e.g., number of taps) of the user input.

In operation 330, the touch-input module 220 determines the pressure of the user input. In some embodiments, the touch-input module 220 may also determine additional user input descriptors, as discussed above. The user input identifies an item from among the set of search results displayed, based on the location of the user input on the graphical user interface of the touch-input device (e.g., client device 110).

In operation 340, the commerce action module 230 determines an appropriate commerce action from among a set of commerce actions based on at least the pressure of the user input. The commerce action may include a purchase of a particular item from among the search results, adding a particular item to a watch list, bidding on an item, or requesting user login credentials.

In operation 350, having determined an appropriate commerce action based on a pressure of a received user input, the commerce action module 230 may communicate the commerce action to the communication module 250 in order to execute the selected commerce action. The communication module 250 may then transmit a request from a user device (e.g., the client device 110) to the enhanced shopping action system 150, which can then execute the commerce action.

Figure 4:
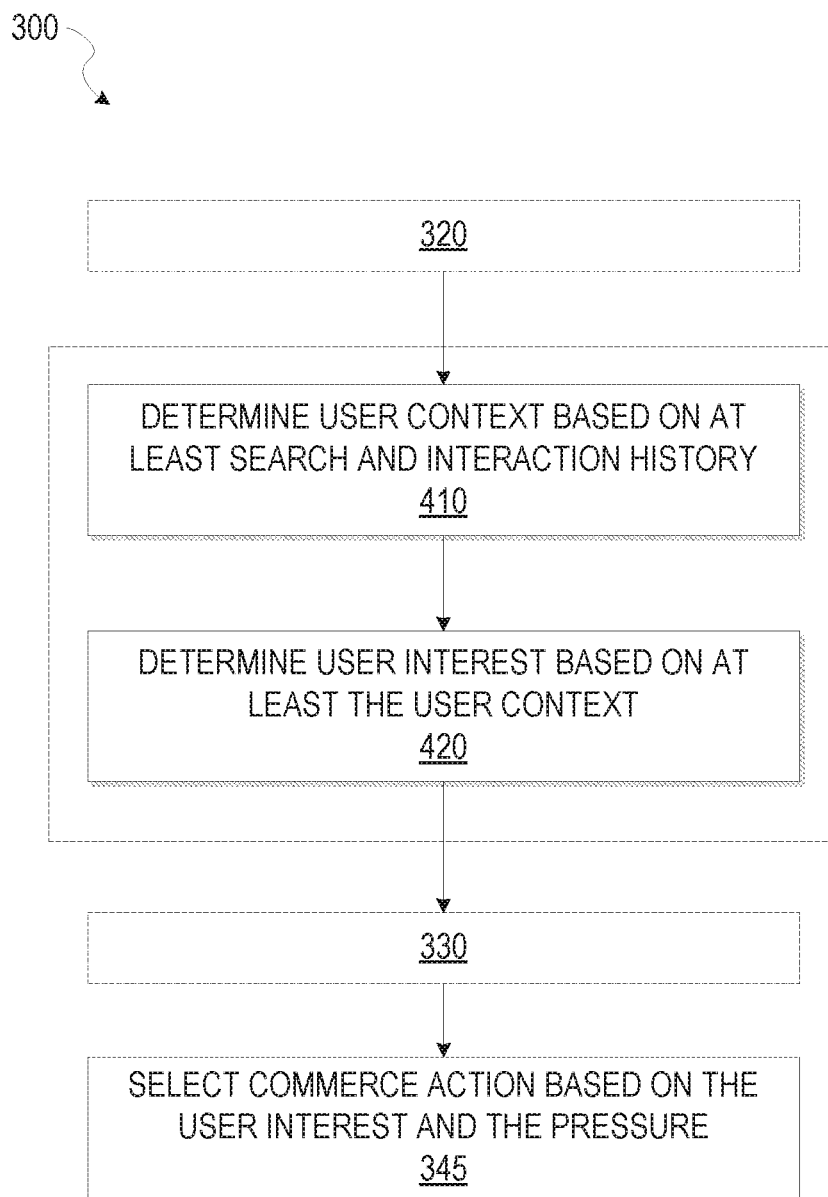
FIG. 4 is a flowchart illustrating operations of the enhanced shopping action system in performing a method determining a user interest level useable to select an appropriate commerce action, according to some example embodiments.

FIG. 4 is a flowchart illustrating additional operations which may be included in performing the method 300, as discussed in FIG. 3. Operations 410 and 420 may be performed as a precursor, sub-routine, or as a part of method 300. As illustrated in FIG. 4, in some example embodiments, operations 410 and 420 may occur after operation 320.

In operation 410, the user interest module 240 determines a user context based on information including at least a search history and an interaction history of the user. As discussed above, the user context describes a state of the user in a session. The user context may simply comprise a collection of all the user's interactions in current or past browsing sessions, as well as a user's transaction history, search query history, and user profile information. To determine the user context, the user interest module 240 accesses one or more databases (e.g., databases 126), third party servers 130, as well as the client device 110, in order to collect the user interaction data, the user transaction history, the search query history, as well as the user profile information.

In some example embodiments, the interaction history includes categories which the user typically purchases from, as well as a price range of items which the user regularly purchases. For example, the user interest module 240 may determine that a particular user frequently purchases items from a particular category (e.g., electronics, men's shoes, automotive), and that the user would therefore be more likely to purchase items from those categories again, as opposed to a category which the user infrequently purchases from. The user context would therefore indicate a greater interest in purchasing items from categories frequently purchased from.

The user interest module 240 may also calculate a price range of the user's regular purchases and determine that the user is most likely to make frequent purchases within the calculated price range. For example, the user interest module 240 may determine that the user has a higher user interest for items within the determined price range, with the user interest decreasing as the price exceeds the price range.

In operation 420, the user interest module 240 determines a user interest level based on at least the user context information associated with the particular user. For example, the user interest module 240 may determine, based on the collected user context information (e.g., indicating that the user has purchased an item in monthly intervals, or has search for and viewed the item in one or more instances over a period of time), that a particular user intends to immediately purchase a particular item from among a set of search results, or instead, that the user only wishes to view more information about the item from among the search results.

For example, the user context information may indicate that a user regularly purchases a particular item in monthly intervals. Additionally, the user context information may indicate that the user has conducted several search requests for the item in the last few days. Based on the user context information, the user interest module 240 may make a determination that the user interest level is high, and that the user intends to purchase the item once they have located a suitable option. Alternatively, assume that a particular user has conducted ten search requests within the period of an afternoon for similar, but not identical, items. Based on this user context information, the user interest module 240 may make a determination that the user interest level is low, and that the user may only wish to do further research.

Having determined a user interest level, based on the user context information, the user interest module 240 transmits the determined user interest level to the commerce action module 230. At operation 345 the commerce action module 230 selects an appropriate commerce action from among a set of commerce actions, based on a determined pressure (e.g., as discussed with respect to method 300), as well as a determined user interest level. In some example embodiments, the commerce action module 230 selects a set of commerce actions based on the user interest level (e.g., high user interest, low user interest), and then selects an appropriate commerce action from among the set of commerce actions based on the determined pressure of the user input. For example, each user interest level may have an associated set of commerce actions which may be selected based on the determined pressure.

In further embodiments, the user (e.g., user 106) defines one or more gesture to result in a particular commerce action. For example, the user may indicate that a firm pressure combined with a high user interest level should result in an immediate purchase of a selected item, while a firm pressure combined with a low level of interest should simply add the item to a watch list.

Figure 5:
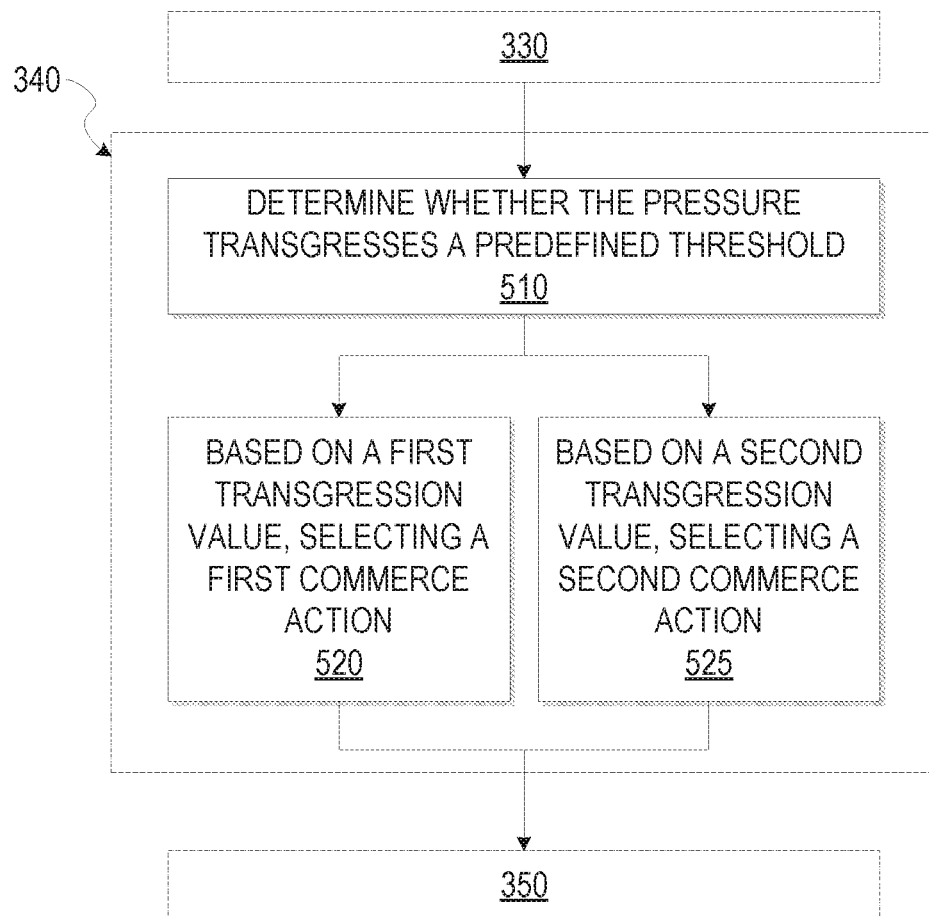
FIG. 5 is a flowchart illustrating operations of the enhanced shopping action system in performing a method of selecting commerce actions based on a user input, according to some example embodiments.

In FIG. 5, one or more operations 510, 520, and 525 may be performed as part (e.g., a precursor task, a subroutine, or portion) of operation 340 of the method 300, in which the commerce action module 230 selects a commerce action based on a pressure of a received user input, according to some example embodiments.

Operation 510 may be performed by the touch-input module 220 and the commerce action module 230. In some embodiments, the commerce action module 230 selects a commerce action from among a set of commerce actions, at least in part, based on the pressure of a received user input. For example, each commerce action includes a corresponding pressure such that a first pressure (e.g., a firm pressure) results in a first commerce action, while a second pressure (e.g., a light pressure) results in a second commerce action. Thus, the commerce action module 230 receives a pressure of the user input in order to select an appropriate commerce action. Having detected the occurrence of a user input (e.g., touch, tap, or swipe) the touch-input module 220 determines whether a pressure corresponding to the user input transgresses a predefined threshold.

The commerce action module 230 associates a pressure of a user input with a particular commerce action, based on preconfigured settings, or based on user provided definitions. At operations 520 and 525, the commerce action module 230 selects a commerce action based on the pressure determined by the touch-input module 220 transgressing one or more threshold values. At operation 520, having determined that the pressure of the user input transgresses a first predefined threshold value, the commerce action module 230 selects a first commerce action. Alternatively, at operation 525, the touch-input module 220 determines that the user input transgresses a second predefined threshold value, and the commerce action module 230 selects a second commerce action.

Figure 6:
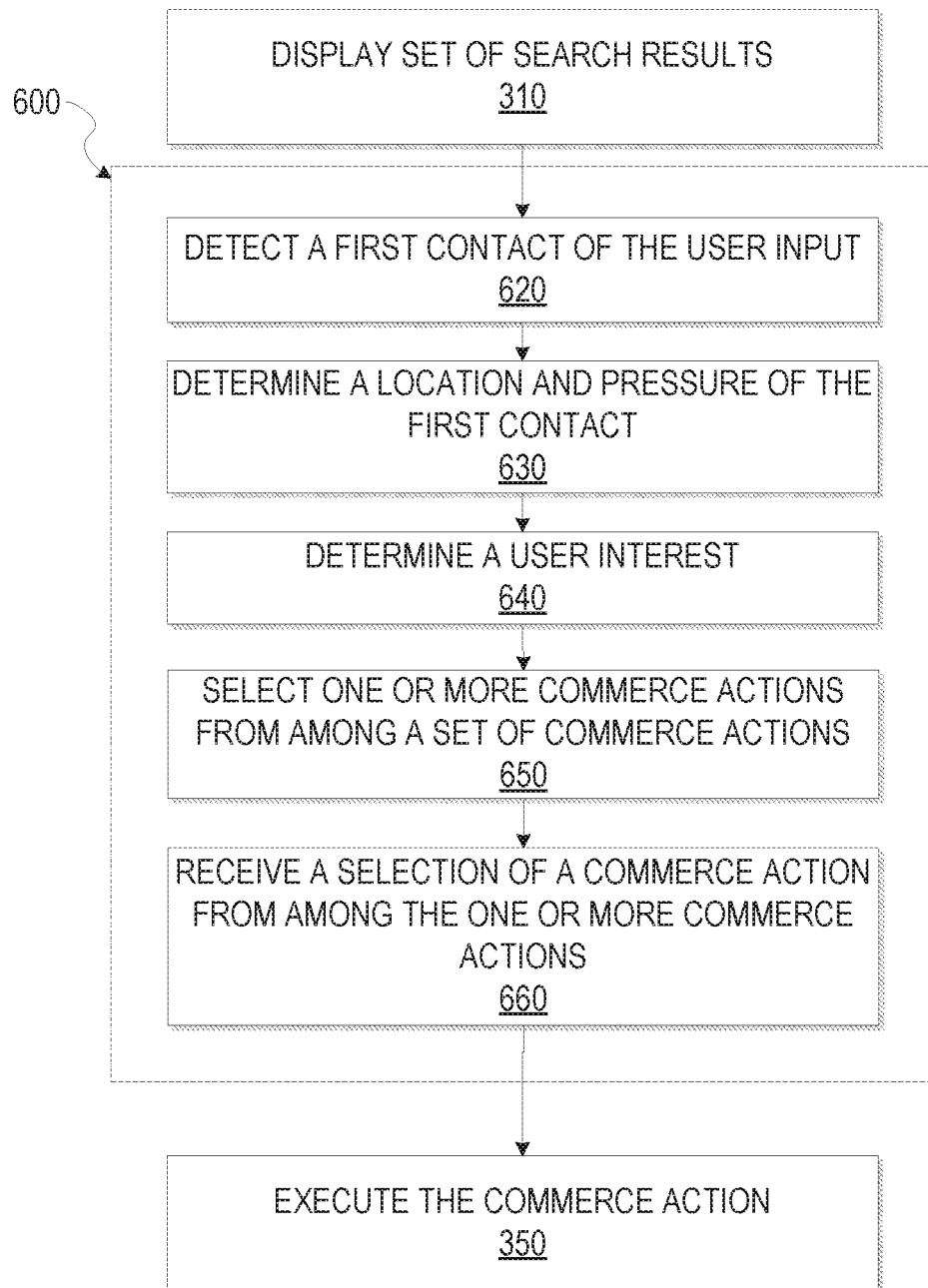
FIG. 6 is a flowchart illustrating operations of the enhanced shopping action system in performing a method of detecting a user input, selecting an appropriate commerce action, and executing the commerce action, according to some example embodiments.

FIG. 6 is a flowchart illustrating operations of the enhanced shopping action system in performing a method 600 of detecting a user input, selecting an appropriate commerce action, and executing the commerce action, according to some example embodiments. Operations of the method 600 may be performed by the modules described above with respect to FIG. 2. As shown in FIG. 6, the method 600 may include operations 620, 630, 640, 650, and 660. One or more operations 620, 630, 640, 650, and 660 may be performed as part (e.g., a precursor task, a subroutine, or portion) of the method 300, according to some example embodiments.

In operation 620, the touch-input module 220 detects a first contact of a user input received at a user device (e.g., client device 110). The first contact of the user input includes a corresponding location and pressure, and each search result among a set of search results displayed has a corresponding display location within the graphical user interface of the user device.

In operation 630 the touch-input module 220 determines the pressure and location of the first contact. The location of the first contact identifies a specific search result from among a set of search results displayed at the user device (e.g., client device 110). The pressure of the first contact determines a desired commerce action to be executed on the selected search result from among the set of search results. The touch-input module 220 provides the location and pressure information to the commerce action module 230 in order to determine an appropriate commerce action to be carried out on a specific search result from among a set of search results.

In operation 640, the user interest module 240 determines a user interest level of an identified user. The user may be identified based on user login credentials (e.g., provided by the user), or by associating a particular user with a specific user device (e.g., user 106 may be associated with client device 110), or location (e.g., based on global positioning system coordinates). The user interest level of the identified user indicates an interest level in a particular item, or items, among the set of search results. For example, a high user interest level for a first item indicates an interest to immediately purchase the item, while a low user interest level for the first item indicates an interest for further details and item information. The user interest module 240 determines the user interest level based on a user context. The user context includes at least user profile information, user login status, a user interaction history, a user transaction history, and past search queries.

In operation 650, the commerce action module 230 determines an appropriate commerce action from among a set of commerce actions, based on at least the determined pressure and location of the first contact, and the user interest level (e.g., high interest, medium interest, low interest, etc.). For example, each commerce action within the set of commerce action may have an associated combination of interest level and pressure which the commerce action module 230 may use to determine the appropriate commerce action to execute. In some example embodiments, the set of commerce actions may vary based on the determined user interest level. The commerce action module 230 is configured to determine a set of commerce actions based on the user interest level, and to select a commerce action from among the determined set of commerce actions based on the pressure of the user input. For example, a high user interest level in a particular item results in the commerce action module 230 selecting a commerce action from a first set of commerce actions, while a low user interest level results in a selection of a commerce action from among a second set of commerce actions.

As stated above, the set of commerce actions may vary based on the determined user interest level, and may include an immediate purchase of an identified item, adding an item to a watch list, bidding on an item, requesting user login credentials, and viewing item details. In some embodiments, the commerce action module 230 compiles a set of commerce actions based on the determined user interest level, and selects an appropriate commerce action from the set of commerce actions based on the pressure of the user input.

In operation 660, the commerce action module 230 selects a commerce action from among a set of commerce actions, based on at least the pressure of the user input. For example, each commerce action among the set of commerce actions may define a threshold pressure value such that a transgression of the threshold value by the first contact of the user input indicates a selection of the corresponding commerce action. Having selected a commerce action from among the set of commerce actions, at operation 350, after detecting a release of the user input, the commerce action module 230 executes the selected commerce action.

Figure 7:
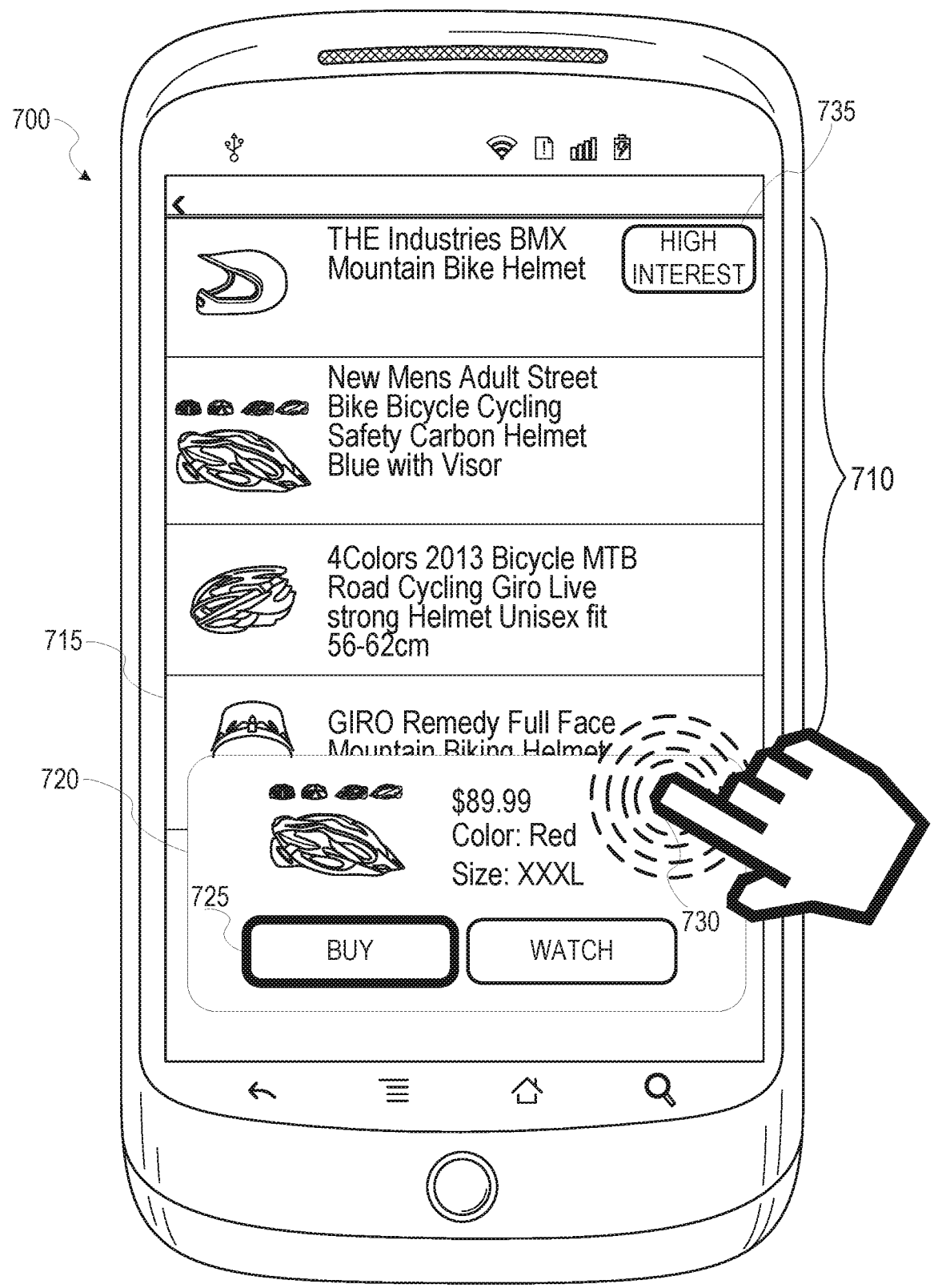
FIG. 7 is a diagram illustrating a graphical user interface, including a set of items available for sale, and a commerce action displayed responsive to a received user input, according to some example embodiments.

FIG. 7 is a diagram of a graphical user interface 700 to display a set of search results 710 on a user device (e.g., client device 110). The graphical user interface 700 includes a set of commerce actions 720 based on a determined user interest level, and as indicated by the user interest level indicator 735 (e.g., a high user interest). The set of commerce actions 720 are displayed responsive to a user input 730. In some embodiments, the set of commerce actions 720 are dynamic, and change based on the pressure of the user input (e.g., user input 730) and the user interest level. The user input 730 includes an associated pressure and location. The location of the user input 730 is at a position in the graphical user interface 700 associated with a search result 715. Based on the location and pressure of the user input 730, and the user interest level (e.g., as indicated by user interest level indicator 735), the enhanced shopping action system 150 selects a commerce action 725 from among the set of commerce actions 720. Because the user input 730 is a firm pressure, and the user interest level is indicated by the user interest indicator 735 as being a high interest, the enhanced shopping action system 150 selects the commerce action 725 to immediately purchase the item. Alternatively, a less interested user (as determined based on the pressure of the user input and user interest level) may be presented with a set of commerce actions corresponding to the determined user interest level and pressure of the user input. In other embodiments, the commerce action (e.g., commerce action 725) is selected from among the set of commerce actions (e.g., the set of commerce action 720), and is executed automatically based on the determined pressure of the user input (e.g., user input 730) and user interest level.

Figure 8:
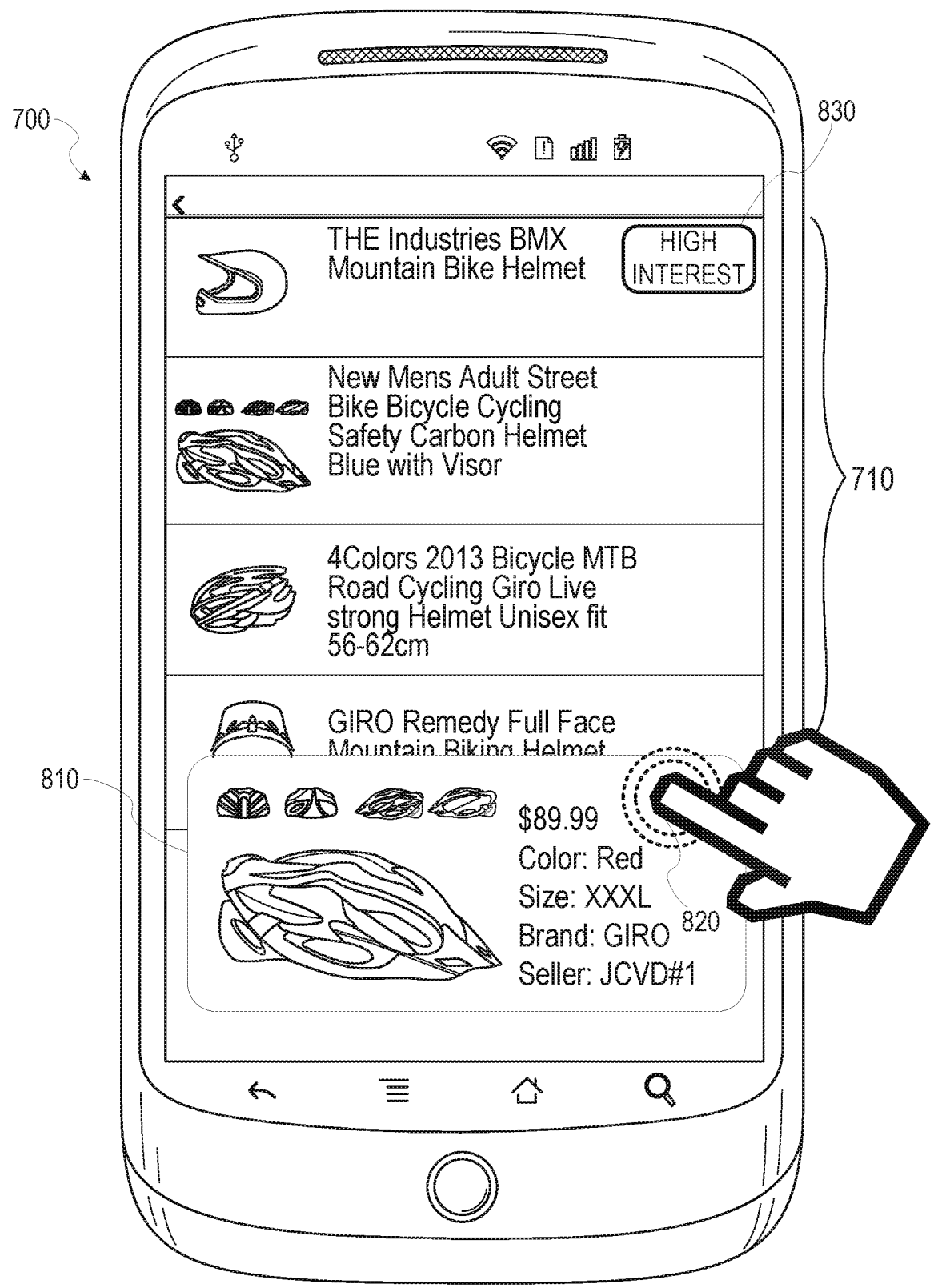
FIG. 8 is a diagram illustrating a graphical user interface, including a set of items available for sale, and a commerce action displayed responsive to a received user input, according to some example embodiments.

FIG. 8 is a diagram of the graphical user interface 700 to display a set of search results 710 on a user device (e.g., client device 110). In some embodiments, the set of search results 710 may be displayed as a set of graphical elements (e.g., thumbnail images, icons) with no item information displayed, wherein the item information is displayed responsive to a received user input. The graphical user interface 700 includes an executed commerce action 810, and a user interest indicator 830. The commerce action 810 is executed responsive to the user input 820. The user input 820 includes an associated pressure (e.g., soft pressure) and location within the graphical user interface 700. Responsive to receiving the user input 820, determining that the user input 820 is a soft pressure input, and the user interest level being indicated by the user interest indicator 830 as high, the enhanced shopping action system 150 selects and executes commerce action 810 to cause display of additional item details. Thus, even though FIG. 7 indicated a high level of user interest, as is also shown in FIG. 8, the enhanced shopping action system 150 selects and executes a distinct commerce action to display additional item details (e.g., commerce action 810) based on the pressure exerted by the user input 820.

Figure 9:
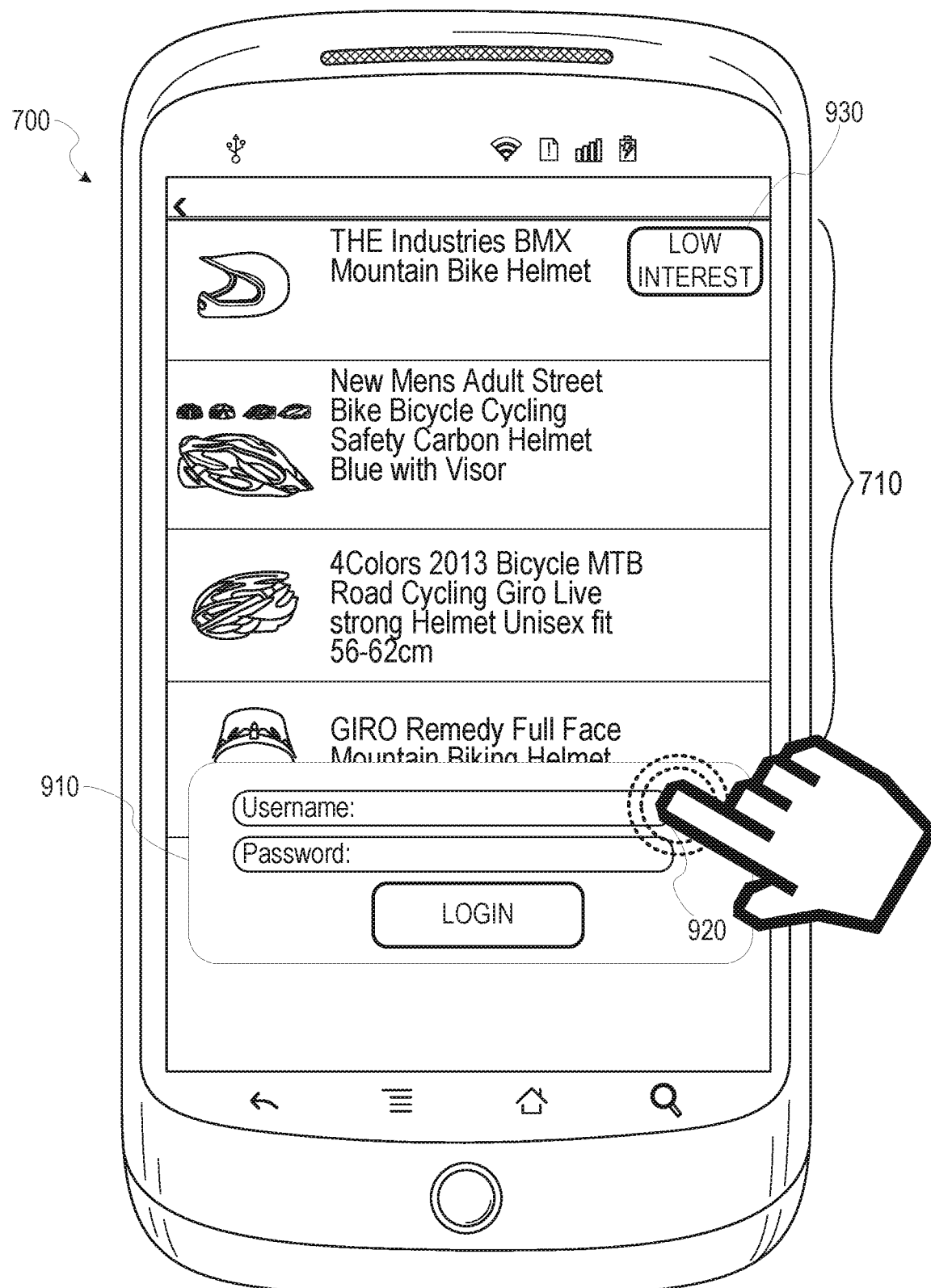
FIG. 9 is a diagram illustrating a graphical user interface, including a set of items available for sale, and a commerce action displayed responsive to a received user input, according to some example embodiments.

FIG. 9 is a diagram of the graphical user interface 700 to display a set of search results 710 on a user device (e.g., client device 110). The graphical user interface 700 includes an executed commerce action 910, and a user interest indicator 930. The user interest indicator 930 indicates a low level of user interest, and the user input 920 is a soft pressure input. Based on the user interest level and the pressure of the user input 920, the enhanced shopping action system 150 selects and executes commerce action 910, requesting login credentials of the user. Thus, even though the pressure of the user input 920 and the pressure of the user input 820 are equivalent, the commerce action (e.g., commerce action 910) selected and executed by the enhanced shopping action system 150 is distinct due to a change in user interest level, as indicated by the user interest indicator 930.

Figure 10:
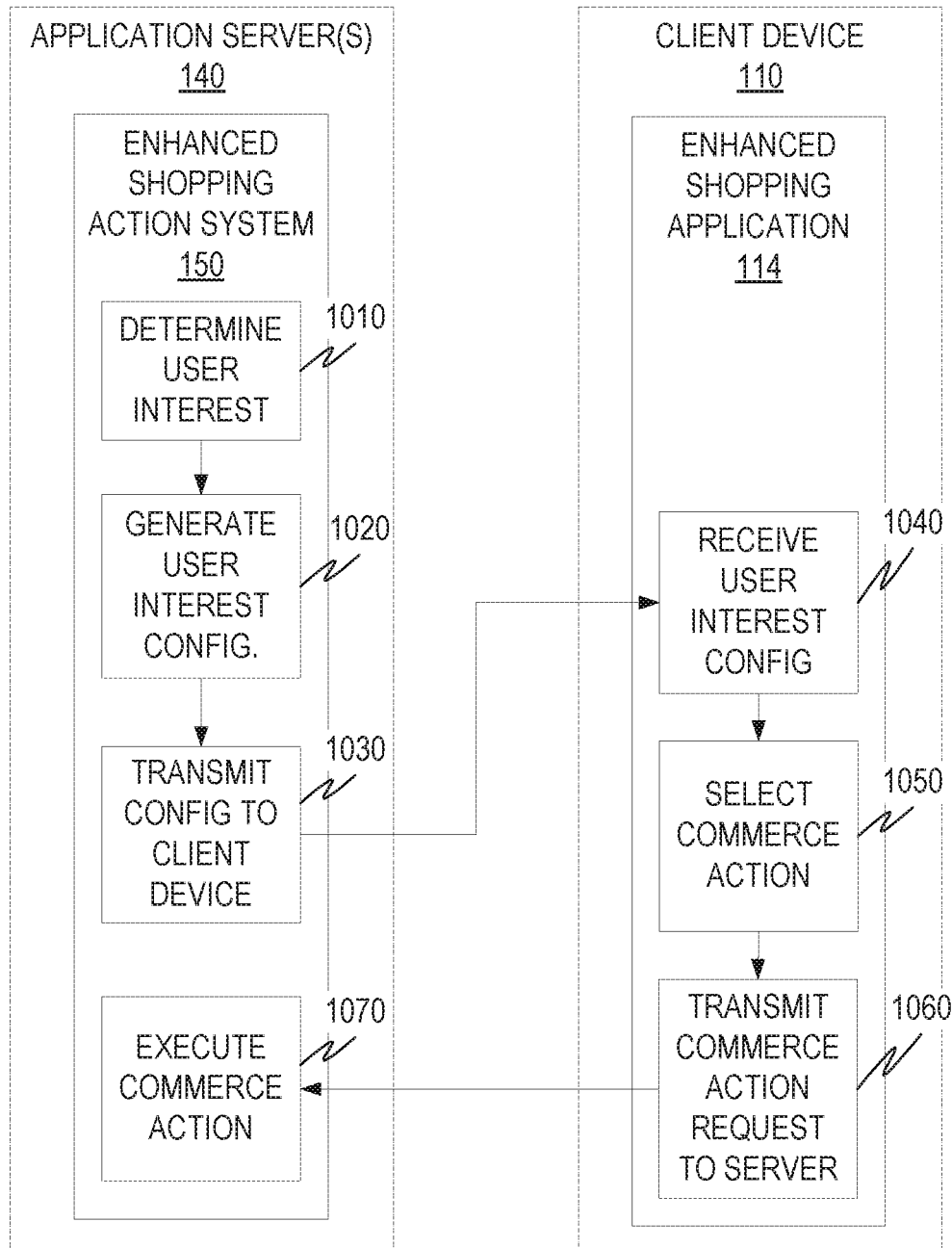
FIG. 10 is an interaction diagram illustrating interactions between a server and a client device in executing the operations of the enhanced shopping action system, according to some example embodiments.

FIG. 10 is an interaction diagram illustrating interactions between the enhanced shopping action system 150, located at the application server(s) 140, and the enhanced shopping application 114, located at a client device 110, according to some example embodiments. At operation 1010, the enhanced shopping action system 150 determines a user interest based on a user context, as discussed with respect to operations 410 and 420 of FIG. 4. The user context includes at least user profile information, a user transaction history, a user interaction history, and user search queries. The enhanced shopping action system 150 generates a user interest configuration based on the determined user interest level at operation 1020, and transmits the user interest configuration to the client device 110 at operation 1030.

At operation 1040, the enhanced shopping application 114 receives the user interest configuration at the client device 110. Based on the user interest configuration, at operation 1050, the enhanced shopping application 114 selects an appropriate commerce action (e.g., as in operation 345 of FIGS. 3 and 4), and at operation 1060, transmits a commerce action request to the enhanced shopping action system 150. At operation 1070, after receiving the commerce action request from the enhanced shopping application 114, the enhanced shopping action system 150 executes the commerce action.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIG. 2 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 11:
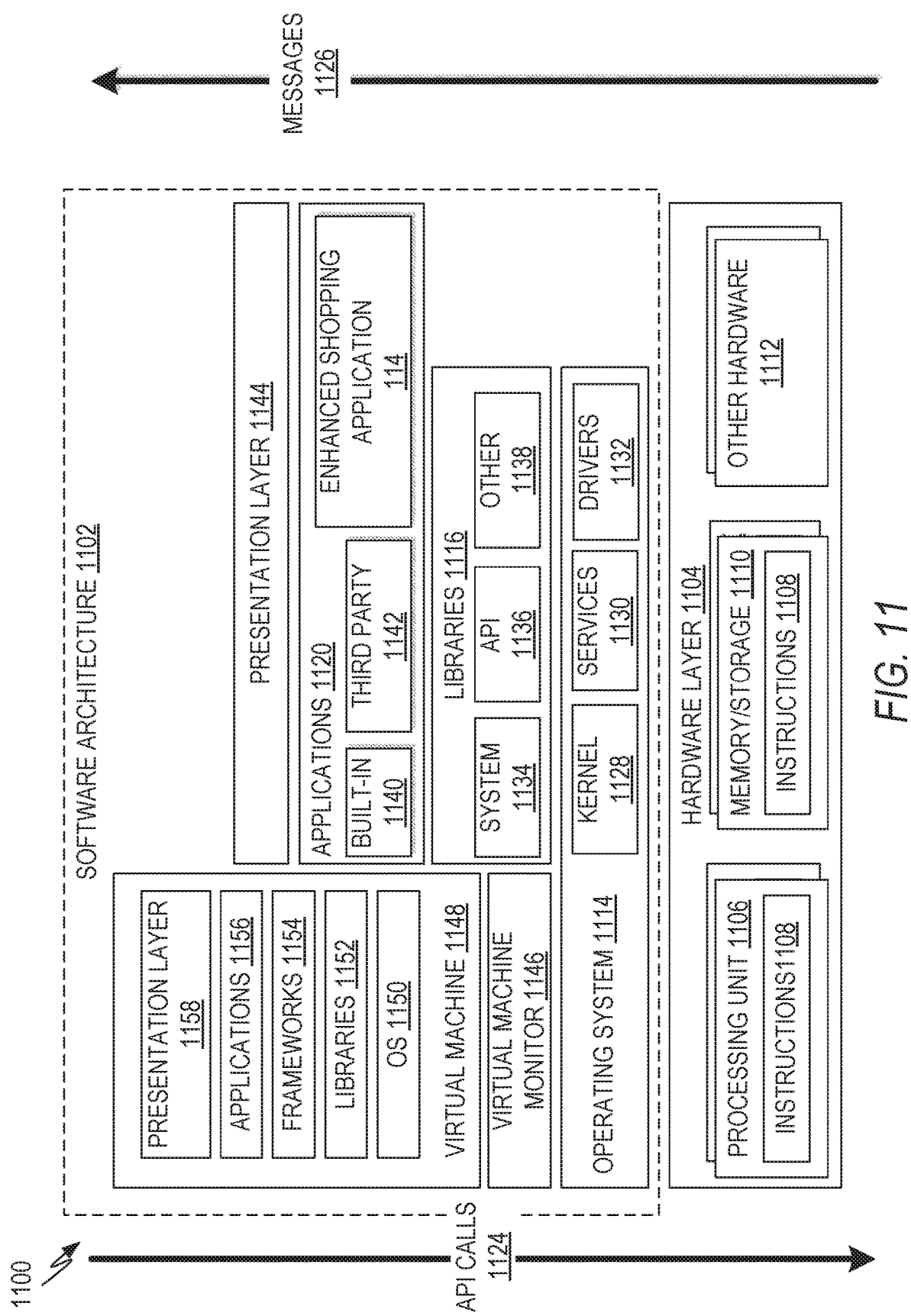
FIG. 11 is a block diagram illustrating an example of a software architecture that may be installed on a machine, according to some example embodiments.

FIG. 11 is a block diagram 1100 illustrating a representative software architecture 1102, which may be used in conjunction with various hardware architectures herein described. FIG. 11 is merely a non-limiting example of a software architecture and it will be appreciated that many other architectures may be implemented to facilitate the functionality described herein. The software architecture 1102 may be executing on hardware such as machine 1200 of FIG. 12 that includes, among other things, processors 1210, memory/storage 1230, and I/O components 1250. A representative hardware layer 1104 is illustrated and can represent, for example, the machine 1200 of FIG. 12. The representative hardware layer 1104 comprises one or more processing units 1106 having associated executable instructions 1108. Executable instructions 1108 represent the executable instructions of the software architecture 1102, including implementation of the methods, modules and so forth of FIGS. 2-5. Hardware layer 1104 also includes memory and/or storage modules 1110, which also have executable instructions 1108. Hardware layer 1104 may also comprise other hardware 1112 which represents any other hardware of the hardware layer 1104, such as the other hardware illustrated as part of machine 1200.

In the example architecture of FIG. 11, the software architecture 1102 may be conceptualized as a stack of layers where each layer provides particular functionality. For example, the software architecture 1102 may include layers such as an operating system 1114, libraries 1116, applications 1120 and presentation layer 1144. Operationally, the applications 1120 and/or other components within the layers may invoke application programming interface (API) calls 1124 through the software stack and receive a response, returned values, and so forth illustrated as messages 1126 in response to the API calls 1124. The layers illustrated are representative in nature and not all software architectures have all layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The applications 1120 includes built-in applications 1140 and/or third-party applications 1142. Examples of representative built-in applications 1140 may include, but are not limited to, a contacts application, a browser application, a book reader application, a location application, a media application, a messaging application, and/or a game application. Third-party applications 1142 may include any of the built-in applications 1140 as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1142 may invoke the API calls 1124 provided by the mobile operating system such as operating system 1114 to facilitate functionality described herein.

The applications 1120 may utilize built-in operating system functions (e.g., kernel 1128, services 1130 and/or drivers 1132), libraries (e.g., system 1134, API libraries 1136, and other libraries 1138), to create user interfaces to interact with users of the enhanced shopping action system 150. Alternatively, or additionally, in some systems interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware machine (such as the machine of FIG. 12, for example). A virtual machine is hosted by a host operating system (operating system 1114 in FIG. 11) and typically, although not always, has a virtual machine monitor 1146, which manages the operation of the virtual machine 1148 as well as the interface with the host operating system (i.e., operating system 1114). A software architecture executes within the virtual machine 1148 such as an operating system 1150, libraries 1152, frameworks/middleware 1154, applications 1156 and/or presentation layer 1158. These layers of software architecture executing within the virtual machine 1148 can be the same as corresponding layers previously described or may be different.

Example Machine Architecture and Machine-Readable Medium

Figure 12:
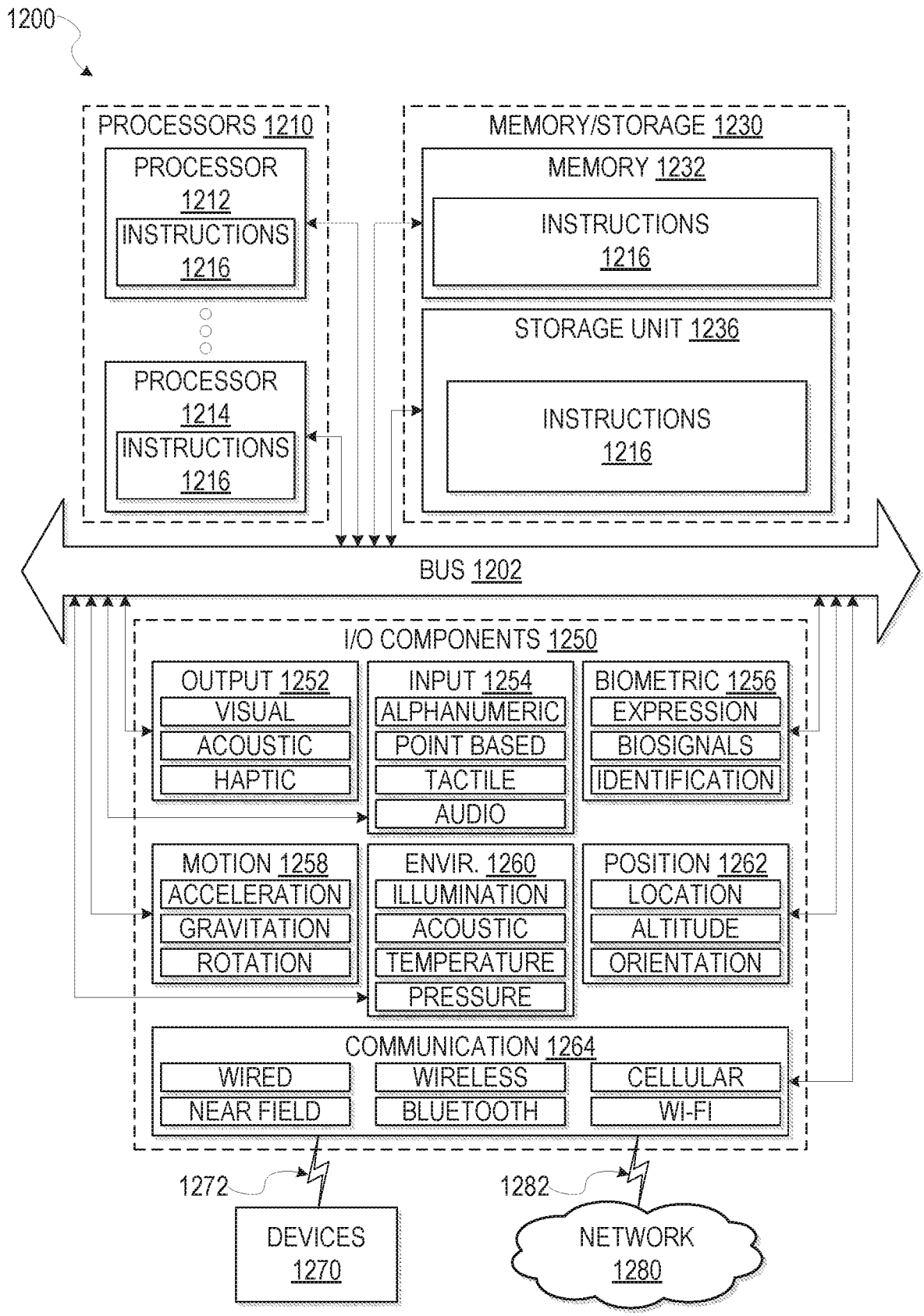
FIG. 12 illustrates a diagrammatic representation of a machine in the form of a computer system within which a set of instructions may be executed for causing the machine to perform any one or more of the methodologies discussed herein, according to an example embodiment.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example the instructions 1216 may cause the machine to execute the flow diagrams of FIGS. 3-6. Additionally, or alternatively, the instructions 1216 may implement the modules of FIG. 2, and so forth. The instructions 1216 transform a general, non-programmed machine into a particular machine programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory/storage 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1212 and processor 1214 that may execute instructions 1216. The term "processor" is intended to include multi-core processor that may comprise two or more independent processors (sometimes referred to as "cores") that may execute instructions contemporaneously. Although FIG. 12 shows multiple processors 1210, the machine 1200 may include a single processor with a single core, a single processor with multiple cores (e.g., a multi-core process), multiple processors with a single core, multiple processors with multiples cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of processors 1210 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262 among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via coupling 1282 and coupling 1272 respectively. For example, the communication components 1264 may include a network interface component or other suitable device to interface with the network 1280. In further examples, communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a Universal Serial Bus (USB)).

Moreover, the communication components 1264 may detect identifiers or include components operable to detect identifiers. For example, the communication components 1264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 1280 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or other type of cellular or wireless coupling. In this example, the coupling 1282 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to devices 1270. The term "transmission medium" shall be taken to include any intangible medium that is capable of storing, encoding, or carrying instructions 1216 for execution by the machine 1200, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A computer-implemented method comprising:
    displaying a plurality of items in a graphical user interface at a client device;
    receiving user input from a user to select an item of the plurality of items;
    determining an input pressure of the user input to select the item;
    determining an interest level of the user in the item based at least in part on user context data associated with the user;
    selecting an action associated with the selected item based on both the input pressure and the interest level of the user in the item; and
    initiating the selected action.

2. The computer-implemented method as described in claim 1, wherein the initiating the action further comprises initiating a first action if the input pressure corresponds to a first pressure and initiating a second action if the input pressure corresponds to a second pressure.

3. The computer-implemented method as described in claim 2, wherein the first pressure is above a pressure threshold value and the second pressure is below the pressure threshold value.

4. The computer-implemented method as described in claim 2, wherein the first pressure comprises firm pressure and the second pressure comprises light pressure.

5. The computer-implemented method as described in claim 1, wherein the initiating the action further comprises initiating a first action if the interest level corresponds to a first interest level and initiating a second action if the interest level corresponds to a second interest level.

6. The computer-implemented method as described in claim 1, wherein the user context data includes one or more of a user search history or a user interaction history.

7. The computer-implemented method as described in claim 1, wherein the action comprises purchasing the selected item, adding the selected item to a list, or bidding on the selected item.

8. The computer-implemented method as described in claim 1, wherein selecting the action further comprises selecting a first action if the input pressure corresponds to a first pressure and the interest level corresponds to a first interest level, and initiating a second action if the input pressure corresponds to a second pressure and the interest level corresponds to the first interest level.

9. The computer-implemented method as described in claim 1, wherein selecting the action further comprises selecting a first action if the input pressure corresponds to a first pressure and the interest level corresponds to a first interest level, and initiating a second action if the input pressure corresponds to the first pressure and the interest level corresponds to a second interest level.

10. The computer-implemented method as described in claim 1, wherein selecting the action further comprises selecting a first action if the input pressure corresponds to a first pressure and the interest level corresponds to a first interest level, and initiating a second action if the input pressure corresponds to a second pressure and the interest level corresponds to a second interest level.

11. A machine-readable storage medium comprising instructions that, when executed by one or more processors of a machine, cause the machine to perform operations comprising:
    displaying a plurality of items in a graphical user interface at a client device;
    receiving user input from a user to select an item of the plurality of items;
    determining an input pressure of the user input to select the item;
    determining an interest level of the user in the item based at least in part on user context data associated with the user;
    selecting an action associated with the selected item based on both the input pressure and the interest level of the user in the item; and
    initiating the selected action.

12. The machine-readable storage medium of claim 11, wherein the initiating the action further comprises initiating a first action if the input pressure corresponds to a first pressure and initiating a second action if the input pressure corresponds to a second pressure.

13. The machine-readable storage medium of claim 12, wherein the first pressure is above a pressure threshold value and the second pressure is below the pressure threshold value.

14. The machine-readable storage medium of claim 12, wherein the first pressure comprises firm pressure and the second pressure comprises light pressure.

15. The machine-readable storage medium of claim 11, wherein the initiating the action further comprises initiating a first action if the interest level corresponds to a first interest level and initiating a second action if the interest level corresponds to a second interest level.

16. The machine-readable storage medium of claim 11, wherein the user context comprises one or more of a user search history or a user interaction history.

17. The machine-readable storage medium of claim 11, wherein the action comprises purchasing the selected item, adding the selected item to a list, or bidding on the selected item.

18. A computing device comprising:
    a touch screen; and
    at least a memory and a processor configured to:
        display a plurality of items in a graphical user interface at a client device;
        receive, via the touch screen, user input from a user to select an item of the plurality of items;
        determine an input pressure of the user input to select the item;
        determine an interest level of the user in the item based at least in part on user context data associated with the user;
        select an action associated with the selected item based on both the input pressure and the interest level of the user in the item; and
        initiate the selected action.

19. The computing device of claim 18, wherein the initiating the action further comprises initiating a first action if the input pressure corresponds to a first pressure and initiating a second action if the input pressure corresponds to a second pressure.

20. The computing device of claim 19, wherein the first pressure is above a pressure threshold value and the second pressure is below the pressure threshold value.

* * * * *